(12) United States Patent
Herslow (10) Patent No.: US 6,644,552 B1
(45) Date of Patent: Nov. 11, 2003

(54) COMPOSITE CARD

(76) Inventor: John Herslow, 1653 Rahway Rd., Scotch Plains, NJ (US) 07076

( * ) Notice: Subject to any disclaimer, the term of this patent is extended or adjusted under 35 U.S.C. 154(b) by 0 days.

(21) Appl. No.: 10/191,942

(22) Filed: Jul. 9, 2002

(51) Int. Cl.[7] .............................................. G06K 19/02
(52) U.S. Cl. ...................................................... 235/488
(58) Field of Search ................................ 235/380, 381, 235/488, 487, 492, 486; 264/161, 272.17; 324/754; 503/227; 283/110, 109

(56) References Cited

U.S. PATENT DOCUMENTS

| | | | | |
|---|---|---|---|---|
| 5,520,863 A | * | 5/1996 | Ochi et al. ................. | 264/46.5 |
| 5,688,738 A | * | 11/1997 | Lu .............................. | 503/227 |
| 6,110,864 A | * | 8/2000 | Lu .............................. | 503/227 |
| 6,509,217 B1 | * | 1/2003 | Reddy ......................... | 438/153 |
| 6,589,642 B1 | * | 7/2003 | Miller et al. ................ | 428/220 |
| 2003/0085721 A1 | * | 5/2003 | Eldridge et al. ............ | 324/754 |

* cited by examiner

*Primary Examiner*—Thien M. Le
(74) *Attorney, Agent, or Firm*—Henry I. Schanzer (57) ABSTRACT

Multi-layered cards embodying the invention include a buffer layer between a PET layer and a PVC layer. The buffer layer is selected to have temperature and stress responsive properties intermediate to those of the PET and PVC layers. The buffer layer is formed of a material which has a low degree of moisture absorbance whereby the surface of the PVC layer is protected from moisture in the atmosphere. The buffer layer is also more elastic than the PVC layer.

17 Claims, 8 Drawing Sheets

COMPOSITE CARD

BACKGROUND OF THE INVENTION

This invention relates to an improved multi-layered (composite) card and to apparatus and methods for the manufacture of composite (multi-layered) cards.

Composite cards are required in many applications where greater card strength and extended durability of the cards are needed or desired; e.g., it is desired to have a card which will typically last in excess of five years rather than the typical two years. Some of these applications include, for example, national identification (ID) cards, college ID cards, smart cards, driver's licenses, cards for holding permanent and long lasting records such as medical records, and security cards. These composite (multi-layered) cards are required to last for a long time even where high temperature levels (hot and cold) and/or a high degree of humidity may be encountered To better understand the discussion to follow, reference is first made to FIG. 1A, which shows a typical prior art composite card formed of a number of layers of PVC (polyvinyl chloride) and PET (polyester terepthalate). The prior art card of FIG. 1A, includes: (a) a core PVC layer, 10, Which is approximately 0.024 to 0.026 inches thick; (b) a clear laminate (12a, 12b) layer of PET material on either side of the core layer 10; each PET layer being approximately 0.002 inches thick , with one PET layer 12a being attached to the top surface (101a) and one PET layer 12b being attached to the bottom surface (101b) of core layer 10; and (c) a third PVC layer (14a, 14b), which may be 0.001 to 0.002 inches thick, may be attached to each one of the outer surfaces (121a, 121b) of each one of the PET layers 12a, 12b.

Figure 1A:
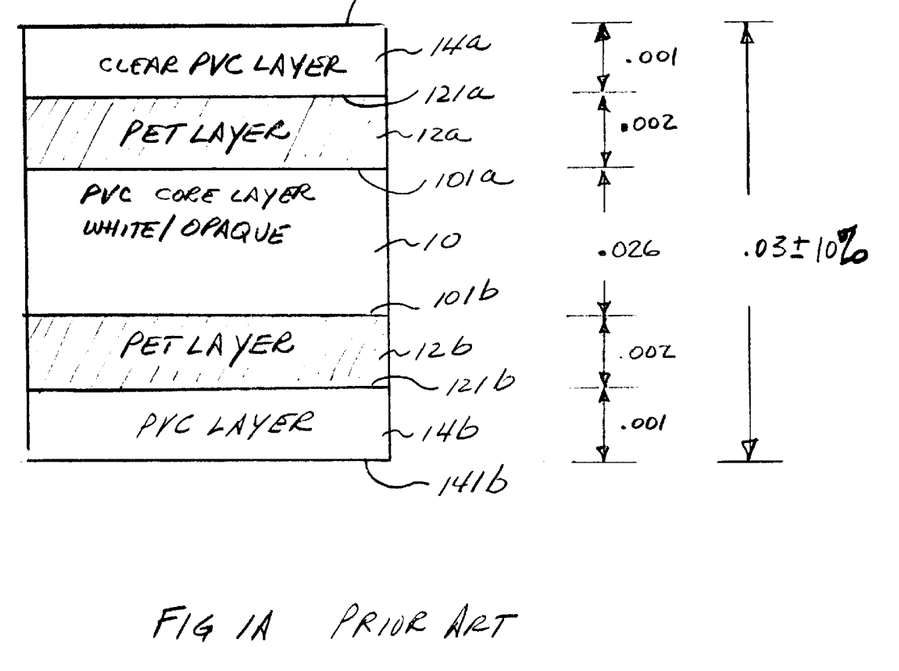
FIGS. 1A, 1B and 1C are cross-sectional diagrams of parts of a prior art card.

The PVC layer is generally used in greater quantity because it is inexpensive and because it is easy to personalize (i.e., information can be written into the PVC layer with relative ease). The PET layer is generally used because it adds strength to the card, is heat resistant, and is relatively impervious to humidity. The PET layers 12a, 12b are normally bonded (attached) to the core PVC layer by techniques such as heat lamination (e.g., at 275° F.). In general, composite cards may be manufactured by bonding two, or more, different layers together. The bonding process may include laminating, heat gluing and/or any other suitable bonding technique.

Figure 1B:
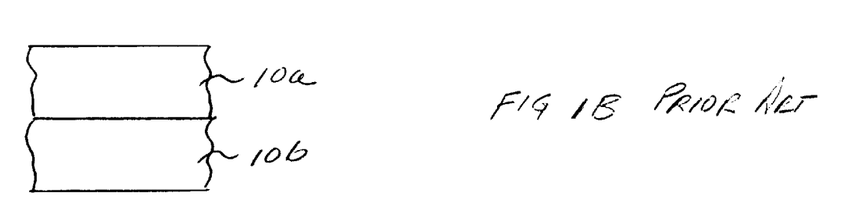

Fixed information is normally applied to the outer surface (101a, 101b) of core layer 10 by offset and/or screen printing. Variable information is normally applied to the outside surfaces 121a, 121b of layers 12a, 12b, or to surfaces of layers 14a, 14b by embossing or thermal printing. Note that the core 10 may be formed of a split core comprised of two(2) layers (10a, 10b) of PVC material, with each layer having a thickness of approximately 0.013 inches, as shown in FIG. 1B.

Figure 1C:
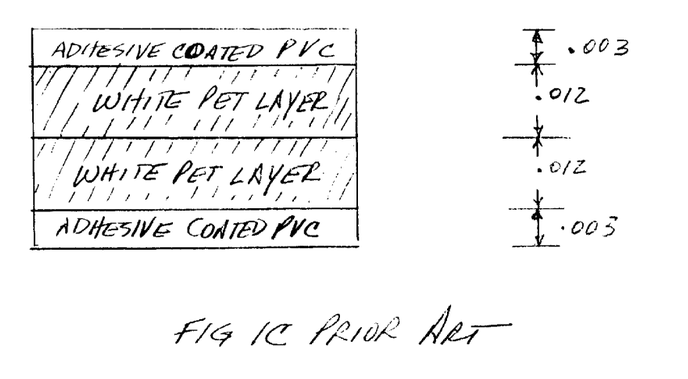

Cards may also be formed as shown in FIG. 1C. In this example, a core of white PET material is covered on top and bottom by an adhesive coated PVC layer.

A significant problem with prior art cards is that the PET layers and the PVC layers have different coefficients of expansion (and contraction) as a function of temperature and stress. As a result, there are significant problems at the interface between the PET and PVC layers. The stress at the interface causes a weakening of the bond between the PET and the PVC layers resulting in distortion (warping) of the cards and/or the separation of the layers.

A finished card acts similarly to an I-Beam. Its strength comes from the outer layers which includes the layers bonded on the top and bottom of the core stock. Just like the strength of an I-Beam comes from its outside surfaces so does a card. This means that the thicker the outer layer of PET, the sturdier the card. However, the coefficient of expansion of the PET, as a function of temperature, is about one-half that of PVC. Thus, due to mechanical stresses at the PET/PVC interface, the bond between the two layers may be at or near the breaking point. Therefore, direct bonds of PVC and PET layers formed by heat are highly stressed and subject to warping and/or subsequent separation.

Also, known prior art composite cards with a white PET core, of the type shown in FIG. 1C, suffer from "Z-axis" failure, or weakness in the thickness direction resulting in the separation of the card layers. This problem with cards having white PET layers is that the whiteners (e.g., a white powder such as titanium dioxide) or other substances (e.g., barium sulfate) within the PET layer contain air bubbles which diffract light and act as opacifiers. However, due to the crystalline structure of PET the base surfaces of these whiteners (and other like substances) do not bond (i.e., do not "wet out" by) to the PET layer, causing the PET film to act as a weak foam.

Regarding the other components used to make cards, typically, most commercial lots of PVC have inconsistent surface contamination, mainly processing waxes, resulting in quality testing inaccuracies and quality assurance problems during card manufacture.

Conventional adhesives used to glue the PVC and PET layers together have not been satisfactory because the adhesives tend to be moisture sensitive. As a result, under extended heat or humidity conditions the adhesive bond is weakened and the card layers separate.

It is therefore desirable to have a composite card in which the problems discussed above are eliminated and the card has a structure which, under normal wear and tear, is durable for an extended period of time (e.g., in excess of 5 years) and is relatively cheap to manufacture.

SUMMARY OF THE INVENTION

Cards embodying the invention include a buffer layer between a PET layer and a PVC layer. The buffer layer is selected to have temperature and stress responsive properties intermediate those of the PET and PVC layers. Thus each buffer layer provides improved bonding to a PET layer on one side and to a PVC layer on the other side. By way of example, where the temperature coefficient of PET is in the range of $25 \times 10^{-6}$ cm per cm for each degree Centigrade (i.e., a one centimeter sample, when heated, will expand 0.000025 centimeters for every ° C. of heat rise) and the temperature coefficient of PVC is in the range of $50 \times 10^{-6}$ cm per cm for each ° C., then the buffer layer will be made to have a temperature coefficient somewhere between. 25 and $50 \times 10^{-6}$ cm per cm ° C. (e.g., in the range of $37.5 \times 10^{-6}$ cm per cm °C.). That is, where one centimeter of PET and one centimeter of PVC, when heated, expand by 0.000025 centimeters and 0.000050 centimeters, respectively, a one centimeter sample of the buffer layer will expand by an amount which lies between the change of the PET and the PVC. In addition to the buffer layer having a specified temperature coefficient, it is preferred to be relatively impervious to humidity; i.e., it has a low degree of moisture absorbance. As a result, a buffer layer protects the surface area of an associated PVC layer from contact with and from absorbing humidity in the surrounding atmosphere. The buffer layer is also selected to be elastic and pliable so as not to be subject to "cracking" when its associated PET and or PVC layers are subjected to bending and like stresses. The buffer layer must also bond easily to PET and PVC. It is also desirable that the cost of the buffer layer be less than the cost of the PET.

Applicant discovered that materials suitable for forming a buffer layer having the properties discussed above include a copolymer of PE (polyethelene) and PVC and thin films of PVC of low molecular weight. Applicant also discovered that a copolymer of PVC and polyvinyl acetate with 10% to 30% acetate content produces a material suitable for forming a desirable buffer layer. Other suitable materials which may be used include: polyolefins, ethylene, vinyl acetate, amorphous polyesters and acrylics.

The buffer material used to practice the invention may be stretched during the course of being manufacture beyond its elastic limits in one or preferably two directions (e.g., the "machine direction" which may be defined as the direction in which the buffer material is being drawn through a processing machine and the "transverse direction" which is generally perpendicular to the machine direction) and heat annealed to prevent stress cracking.

The thickness of the buffer layer may vary over a wide range (e.g., from less than 0.001 inches to more than 0.01 inches). The limitation on the thickness of the buffer layer being determined by the maximum allowable thickness of the card (typically 0.03 inches) and the thickness of the core portion and outer layers (i.e., the PVC and PET layers).

Therefore, cards embodying the invention include a buffer layer between a PET layer and a PVC layer, with the buffer material being made up of a material to reduce or mitigate stress at its interface with a layer of PET on one side and a layer of PVC on the other side. The buffer layer reduces the bonding problem. The buffer layer combines the properties of PVC material and the PET material, thus reducing the stress at all the interfaces.

The strength of cards embodying the invention is due to a great extent to the outer layers which make their construction sturdier. An outer layer may incorporate a PET layer, a buffer layer and a PVC layer. The thickness of the various layers are adjusted to maintain a typical overall card thickness of 0.030 inches.

Using a buffer layer also enables good products to be formed from a wider range of PVC suppliers because it allows a higher PVC defect rate and wider range of PVC product properties to be used more successfully.

BRIEF DESCRIPTION OF THE DRAWINGS

In the accompanying drawings like reference characters denote like components.

DETAILED DESCRIPTION OF THE INVENTION

Figure 2:
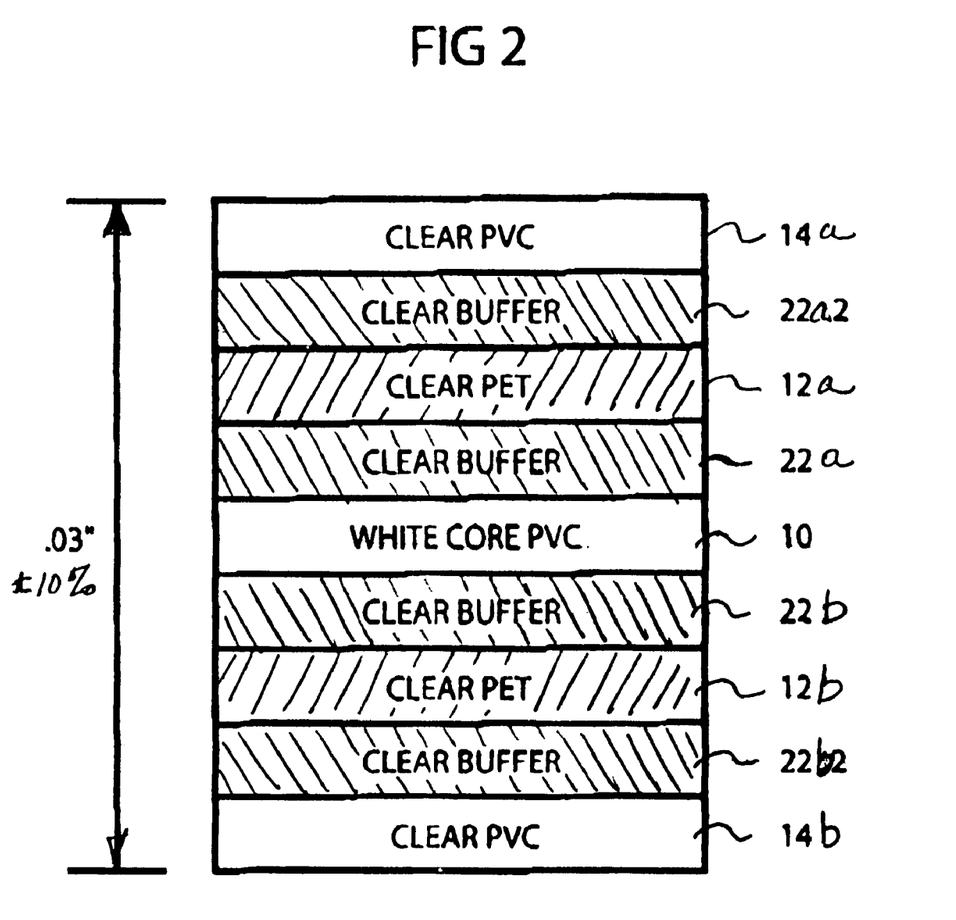
FIG. 2 is a cross-sectional diagram (not to scale) of a card formed in accordance with the invention.

A multi-layered card embodying the invention may be formed as shown in FIG. 2. The thickness of the cards embodying the invention is in the range of 0.03 inches (+/−10%). Different layers of material of varying thickness, like a sandwich, are used to form the cards. In FIG. 2, the card includes a core which may be a single solid core 10. Alternatively, the core may be a split core 10a, 10b, as shown in FIG. 1B, where the thickness of the two (or more) split portions equals the thickness of the single solid core.

In the embodiment shown in FIG. 2 the core 10 is comprised of a core layer 10 of white PVC material. Note that PVC material as used herein refers to polyvinyl chloride or to a compound thereof and may also include polyvinyl chloride acetate (PVCA) or like polymers or copolymers. Alternatively, the core 10 may be made of thermoplastic polyesters such as amorphous PET or glycol-modified polyethylene terephthalate (PETG).

The thickness of the core 10 may range from less than 0.006 inches to close to 0.026 inches. The card shown in FIG. 2 is "symmetrical" in that for each layer placed on one side (e.g., top) of the core 10, a like layer is placed on the other side (e.g., below) of the core 10. In FIG. 2, a clear buffer layer (22a, 22b ), having properties discussed below, is attached (bonded) to each one of the top and bottom surfaces of the core 10. Each buffer layer may range from less than 0.001 inches to more than 0.01 inches and, in general, a buffer layer is disposed between each PVC and PET layer.

In FIG. 2, a clear PET layer 12a is attached (bonded) to the top side of buffer layer 22a and a PET layer 22b is attached (bonded) to the bottom side of buffer layer 22b. Each PET layer may range from less than 0.001 inches to more than 0.02 inches. However, in the embodiment of FIG. 2; the PET layer would preferably not be thicker than 0.006 inches. It should be understood that in cards embodying the invention the layer of PET may be replaced by a layer of polycarbonate. That is, whenever a layer of PET is shown, the layer may be replaced by a layer of polycarbonate. In this application and in the claims appended hereto, reference to PET also includes "oriented" PET (OPET) which refers to a thermoset material which has been formed by bi-axial stretching of the material (i.e., in the machine and transverse directions).

In FIG. 2, a clear buffer layer 22a2 is attached to the top surface of PET layer 12a and a clear buffer layer 22b2 is attached to the bottom surface of PET layer 12b. As discussed above, the thickness of each buffer layer may range from less than 0.001 inches to more than 0.01 inches. Each one of the buffer layers may be formed of any suitable material [e.g., a thermoplastic] whose response to temperature and stress is midway between the response of the PVC layer and the PET layer, between which it is disposed. The buffer layers thus function to reduce the stresses and strains which exist in the prior art structures and which would otherwise be generated by the large differences in expansion and contraction with temperature between PVC and PET. The buffer layers may be made of polymers and copolymers of PVC and PE (polyethylene ). Applicant also discovered that a copolymer of PVC and polyvinyl acetate with 10% to 30% acetate content produces a material suitable,for forming a desirable buffer layer. Other materials which may be used to form suitable buffer layers include: polyolefins, ethylene, vinyl acetate, acrylics, etc. Like PET, the materials used for the buffer layer have a low degree of moisture absorbance. This tends to prevent the PVC, over which a buffer layer is formed, from absorbing moisture present in the atmosphere.

The buffer layers 22a, 22b and 22a2, 22b2 are attached to the core PVC and/or PET layers using any known processes including, but not limited to, heat lamination and/or adhesive lamination. This can be accomplished with, platen lamination, hot roll lamination or by applying a flexible radiation cured adhesive which is internally cured after nipping (e.g., squeezing between rollers).

In FIG. 2 a clear overlay PVC layer 14a is attached to the top surface of buffer layer 22a2 and a clear overlay PVC layer 14b is attached to the bottom surface of buffer layer 22b2. [Generally, "clear" layers are used for strength and "white" layers are used for opacity; the choice of which type of layers are used is determined by the card manufacturer for imparting selected characteristics to the cards being made.] Each one of the clear laminate layers (14a, 14b) consists of PVC or like suitable material. In some applications, the layers 14a, 14b may not be needed and buffer layers 22a2 and 22b2 would then define the outer layers of the card. Thus the card may require two (2) layers less than those shown in FIG. 2. Where the buffer layers (e.g., 22a2, 22b2) form the outer layers of the card, and these buffer layers would be personalized; the personalization process would be "tuned" to the characteristics of the buffer material.

Sheets of the material used to form the buffer layer may be stretched beyond its elastic limits in one or preferably two (the machine and transverse) directions and heat annealed to prevent stress cracking. The buffer layer may be strengthened by applying the biaxial stretching during its manufacture. This makes the buffer material stronger and causes it to react in the intended manner.

In cards embodying the invention, fixed information may be printed on the front or back surfaces of the PVC layers 10, 10a, 10b, the buffer layers 22a, 22b, 22a2, 22b2, and the PET layers 12a, 12b.

Note that variable information can be printed on certain surfaces such as overlay layers 14a, 14b, and on the buffer layers of a card when it has been manufactured as a "blank" card. Variable printing may be achieved by diffusion, imaging or thermal transfer or by embossing. Of course, variable information can be printed on each layer prior to a card being manufactured.

In the manufacture of cards embodying the invention pertinent factors in the selection of the PVC, PET and buffer layers include the following:

PVC is a plentiful inexpensive material which has been used in the manufacture of cards for many years and in the printed plastic industry. Devices and processes to personalize cards have been developed around the thermoplastic characteristics of PVC (e.g., embossing, flat card printing, for mass transfer, ink jetting, dye diffusion, thermal printing, overlay patches, etc.). When composite (multi-layered) cards are made, a layer of PVC material is typically printed on the outside of the card (e.g., like a current optical memory card being made for the Immigration and Naturalization Services (INS) "Green Card" card). PVC in its many forms is a mixture of resins, additives and recycled materials resulting in a material whose characteristics and properties are usually not consistent even among the same lot.

PET on the other hand is one of the original engineering plastics which is remarkably pure and consistent due to the care expended in its manufacturing process. PET material tends to be very expensive relative to PVC. In contrast to PVC, PET is very strong and heat resistant (being a thermoset plastic) but is relatively difficult to bond and adhere to other materials and surfaces. An object of the invention is to provide a correct composite lamination of PET into a PVC structure which can extend the life of the structure many fold while increasing the heat resistance from 135 degrees F to over 212 degrees F. This is accomplished by using buffers layers embodying the invention.

The buffer layer serves at least two purposes: 1—to adhere destructively to both PET and PVC (i.e., the buffer can not be pulled apart from the PET or PVC layer without destroying the combination); and 2—to accommodate and mitigate the bond stresses caused by heat and cooling of the PVC/PET layers.

Properties of the buffer layers used in cards embodying the invention include:

1—adhesive properties required to bond to: a—PVC (in practically all commercial forms used in the plastic card business); and b—PET of the type which is commercially available and treated for adhesion and lamination receptivity;

2—A very high elongation at yield characteristic which would give the material high destructive strength and ability to mitigate thermal expansion and contraction; and 3—A coefficient of thermal expansion midway between PET and PVC.

By way of example the temperature coefficients (TC) of PVC, PET and the buffer layer may have the following relative values:

a—The TC of PET may be in the range of $27 \times 10^{-6}$ inches per inch per ° C.;

b—The TC of PVC may be in the range of 50 to $100 \times 10^{-6}$ inches per inch per ° C.; and c—The TC of the buffer layer may be in the range of $30$–$40 \times 10^{-6}$ inches per inch per ° C.

The above numbers are given by way of example only and a wide variation of values may apply. But, it should be clear from the above that the buffer layer tends to mitigate the significantly larger differences which exist between PET and PVC.

Another significant aspect of the buffer layer is its "stretch ability"; i.e., its ability to expand and contract non-destructively. This may be demonstrated by comparing some typical values for the elongation of PET, PVC and the buffer layer. For one sample of materials, the percentage elongation yield in the machine direction (MD) and in the transverse direction (TD) were as follows:

a—for PET—150% in MD and 100% in TD;

b—for PVC—15% in MD and 15% in TD; and c—for the buffer layer—210% in MD and 250% in TD.

Buffer layers having the elongation yield property noted above may be stretched like a rubber band providing a bond between the two surfaces (buffer layer to PVC and buffer layer to PET) which can endure much stress and strain.

Figure 3:
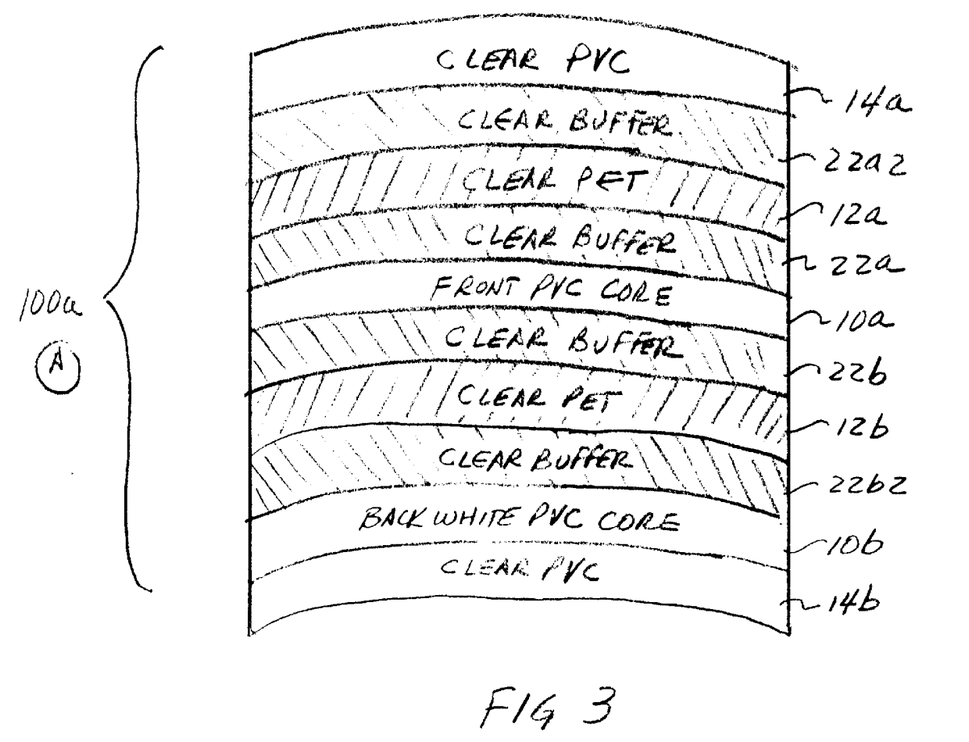
FIG. 3 is a cross-sectional diagram (not to scale) of a portion of an "asymmetric" card formed to have some curvature in accordance with the invention.
Figure 3A:
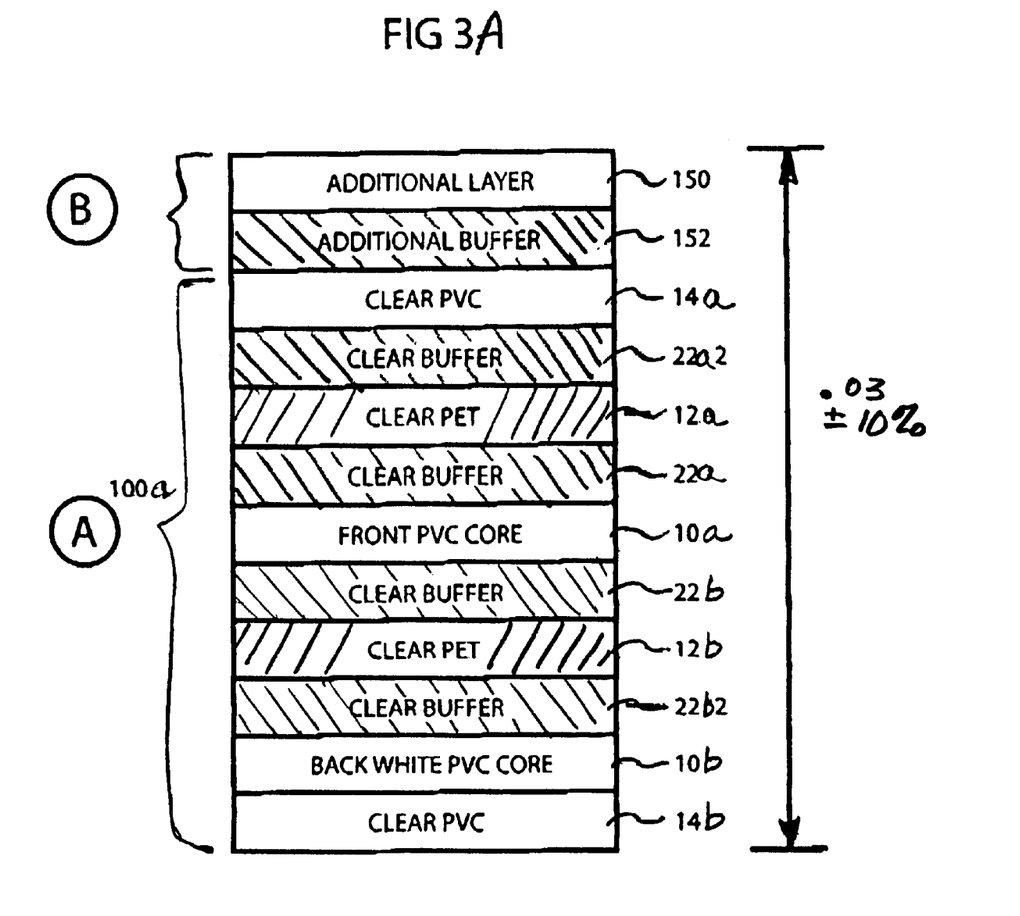
FIGS. 3A and 3B are cross-sectional diagrams (not to scale) of cards formed in accordance with the invention.
Figure 3B:
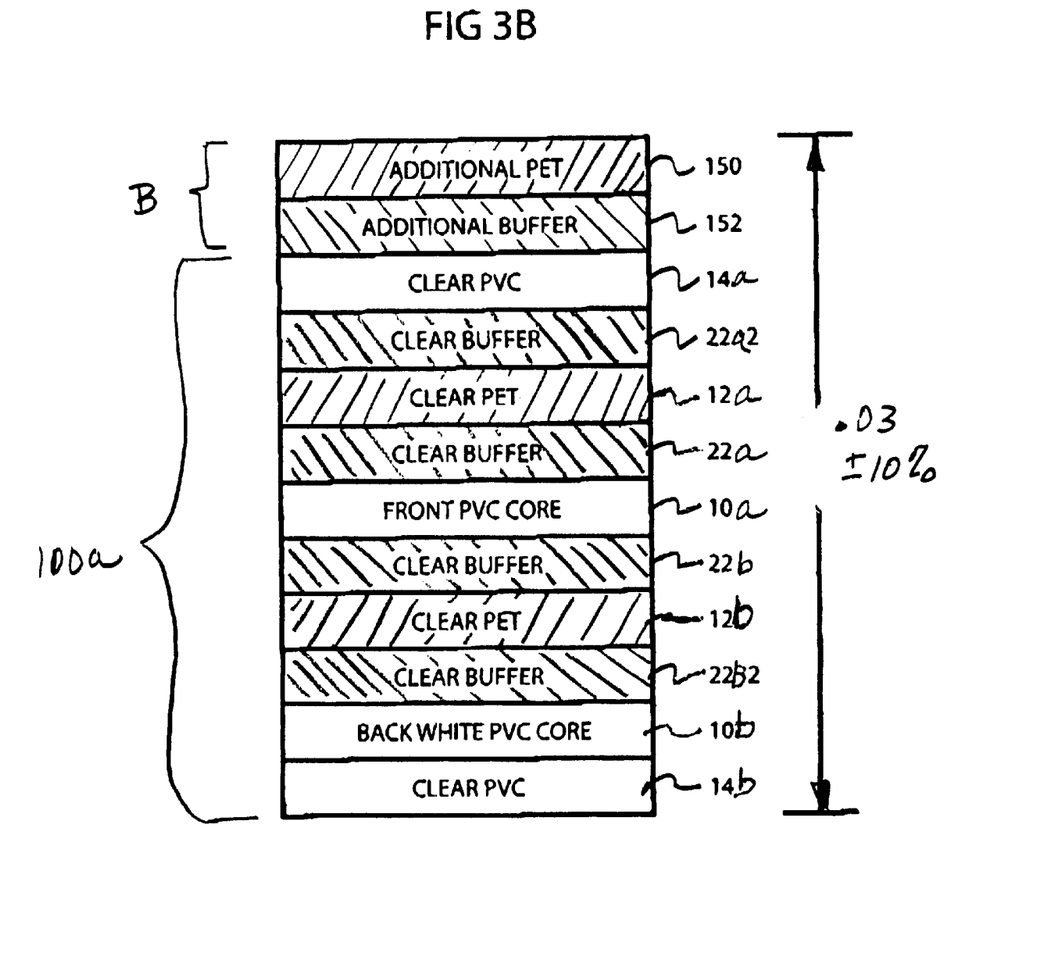

FIG. 3 shows that a stack of layers, 100a, may form part of a card, where the layers are arranged to provide what my be termed to be an "asymmetric" structure. The asymmetric structure 100a may be generated to provide a "sandwich base", identified as a stack A, which is "bowed"; i.e., it may be either of a convex or concave nature. FIG. 3A illustrates that after forming the sandwich base 100a, defining a stack A, and after personalization, one or more additional layers (e.g., 150 and 152), defining a stack B, may be attached to the sandwich base 100a. The additional layers of stack B are selected to compensate or correct for the bow and cause the sandwich base 100a with the additional layer(s) to be "flat" or "straightened" as shown in FIGS. 3A and 3B. FIG. 3B illustrates that the additional layer 150 may be a PET layer and the additional layer 152 may be a layer of buffer material. By way of example, where a polyester "patch" or a heat laminate is attached to a base portion of a card after personalization of the card, the resultant card may be "bowed" toward the "patch". Accordingly, certain structures have been developed which will be bowed in one direction and which will then be "straightened" out after the patch (e.g., PET layer 150 and buffer layer 152) is applied.

In FIGS. 3, 3A and 3B, section 100*a* includes a core PVC layer 10*a* which is made significantly thinner than core 10 of FIG. 1. Above core 10*a* there is a buffer layer 22*a* followed by a PET layer 12*a* followed by a buffer layer 22*a*2 followed by a clear PVC overlay layer 14*a*. Below core 10*a* there is a clear buffer layer 22*b*, followed by a clear PET layer 12*b*, followed by a clear buffer layer 22*b*2. The cards of FIGS. 3, 3A and 3B differ significantly over the prior art shown in FIG. 1 (and the balanced card shown in FIG. 2) by the presence of a core white PVC layer 10*b*, followed by a clear PVC overlay layer 14*b*. Because PVC shrinks more than PET during platen lamination, the presence of the PVC core 10*b* near the back (bottom) of the card causes the card to have a concave shape. In FIGS. 3A and 3B an additional layer 150 is added to protect the card personalization. The layer 150 may be ½ to 1 mil (0.0005 to 0.001 inches) thick. It is typically composed of PET with an adhesive layer and applied with a heat roller Which only applies heat to one side of the card through the additional layer. Bonding at high temperature causes the card to "warp" back toward the additional layer when the structure cools. In the embodiment shown in FIGS. 3A and 3B, if the additional layer 150 is of PET material then, either it could be used instead of PVC layer 14*a* or else an additional buffer layer 152 would be placed between the top of PVC layer 14*a* and PET layer 150. The use of buffer layers embodying the invention aids in the distribution of stresses and strains between the PET and the PVC layers and in the straightening of the card.

Referring to FIG. 3B, in one embodiment of the invention the thickness of each of the various layers was approximately as follows: PET layer 150 was ½ mil (0.0005 inches); layers 12*a* and 12*b* were 4 mils (0.004 inches) each; buffer layers 152, 22*a*2, 22*a*, 22*b*, and 22*b*2 were 1 mil each; PVC core 10*a* and 10*b* were each 7 mils and PVC layers 14*a* and 14*b* were 2 mils each.

Figure 4:
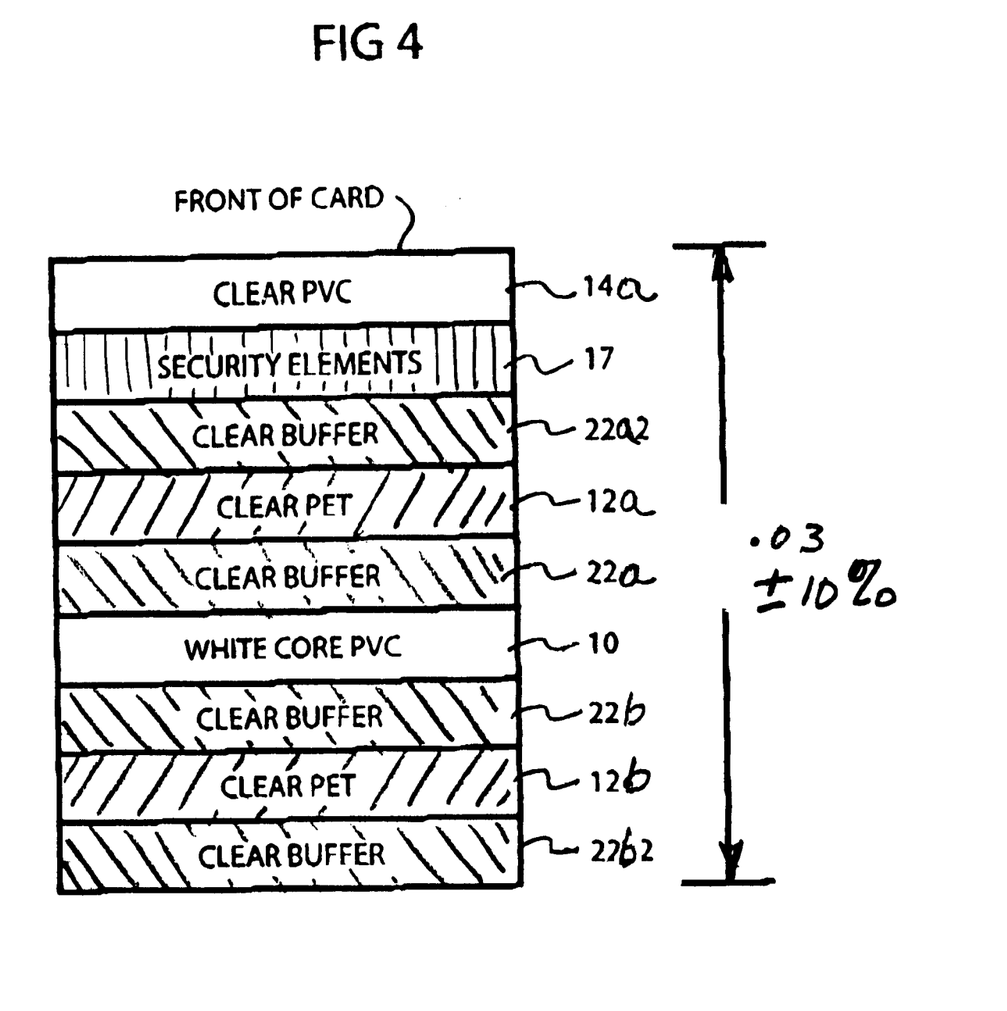
FIGS. 4 and 5 are cross-sectional diagrams (not to scale) of cards formed in accordance with the invention.

The cards shown in FIGS. 2, 3A or 3B maybe modified as shown in FIG. 4 to incorporate security elements within the card. The buffer layers (e.g., 22*a*2) enable security elements to be inserted in a more reliable and sturdier manner. The basic reason is that the buffer layers "strengthen" the bonds between the various layers (PVC or PET) of dissimilar materials and the carriers of the security elements. This enables a card with better characteristics to be manufactured. In FIG. 4, the modification includes the placing, of security elements in a layer region 17 between the interior (back) side of a top, overlying, PVC layer 14*a* and the top side of buffer layer 22*a*2. The security elements may include:

a—liquid crystals and/or other optically variable devices (OVDs);

b—inks printed or placed on the back side of 14*a* or the front or back side of 22*a*2; or c—optic fibers or "threads" placed between layers 14*a* and 22*a*2 or inserted within the buffer region 22*a*2.

Referring to FIG. 4, in one embodiment the thickness of the various layers were approximately as follows: PVC layer 14*a* was 2 mils; security element layer 17 was 2 mils; buffer layers 22*a*2, 22*a*, 22*b* and 22*b*2 were 1 mil each; PET layers 12*a* and 12*b* were 4 mils each; and core PVC layer 10 was 15 mils.

Figure 5:
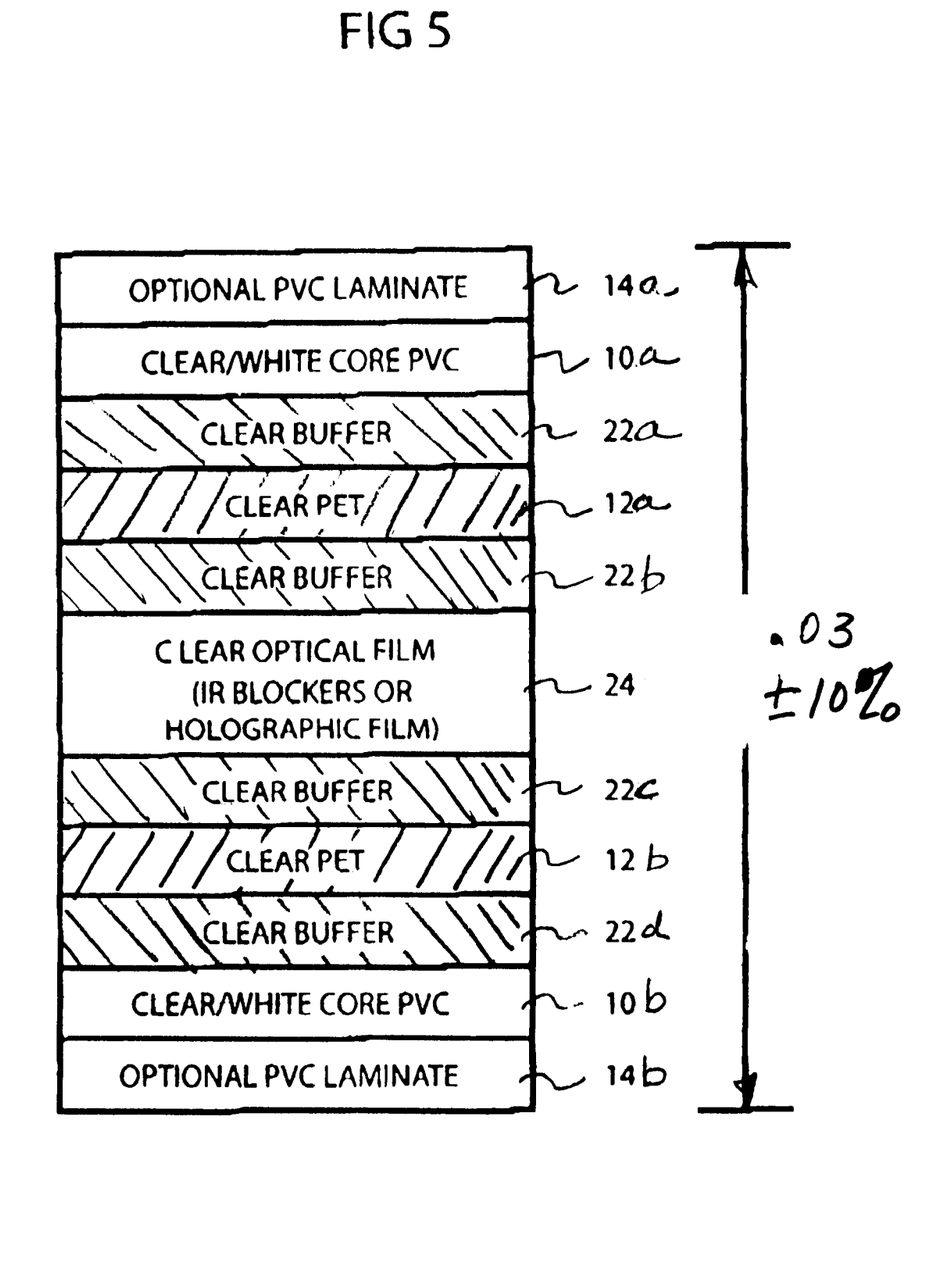

The use of buffer layers to absorb the difference between layers having substantially different characteristics enables many different types of sturdy and secure cards to be manufactured. Referring to FIG. 5 there is shown a PVC overlay 14*a* mounted over a core PVC layer 10*a*, overlying a buffer layer 22*a*, which overlies a PET layer 12*a*, overlying a buffer layer 22*b*. A film 24 may be inserted between buffer layers 22*b* and 22*c*. The film 24 may be a clear optical film or an IR blocker or a Holographic film. The thickness of the optical layer may range from 0.0003 inches to more than 0.005 inches. The buffer layers reduce the stress between the very dissimilar materials enabling a more stable structure having a much greater life time and of greater sturdiness. The back side of buffer layer 22*c* overlies a PET layer 12*b* which overlies a clear or white core layer 10*b* which overlies an optional PVC laminate layer 14*b*.

In one embodiment, the thickness of the various layers of the card of FIG. 5 were approximately as follows: PVC laminate layers 14*a*, 14*b* were 2 mils each, the core PVC layer 10*a* was 6 mils, layer 10*b* was 8 mils, the PET layer 12*a* and 12*b* were 1 mils each, and the buffer layers 22*a*, 22*b*, 22*c*, and 22*d* were 1 mil each.

Note that depending upon properties desired and cost constraints - - - polyester layers (the more expensive material) can be placed near both outside surfaces or in the center or unbalanced in the core such that a "bowed" card can be straightened after personalization with a clear lamination.

In general, PVC is used to form the outer layer of a card because it enables the personalization of a card to be made more easily. PVC is also normally used because it enables thermal printing or embossing. PVC based materials are normally much cheaper than PET, whereby the greater use of PVC is desirable for economic reasons. Thus, the layers of PVC material are normally thicker (individually and in the aggregate) than the layers of PET and of buffer material.

Figure 6:
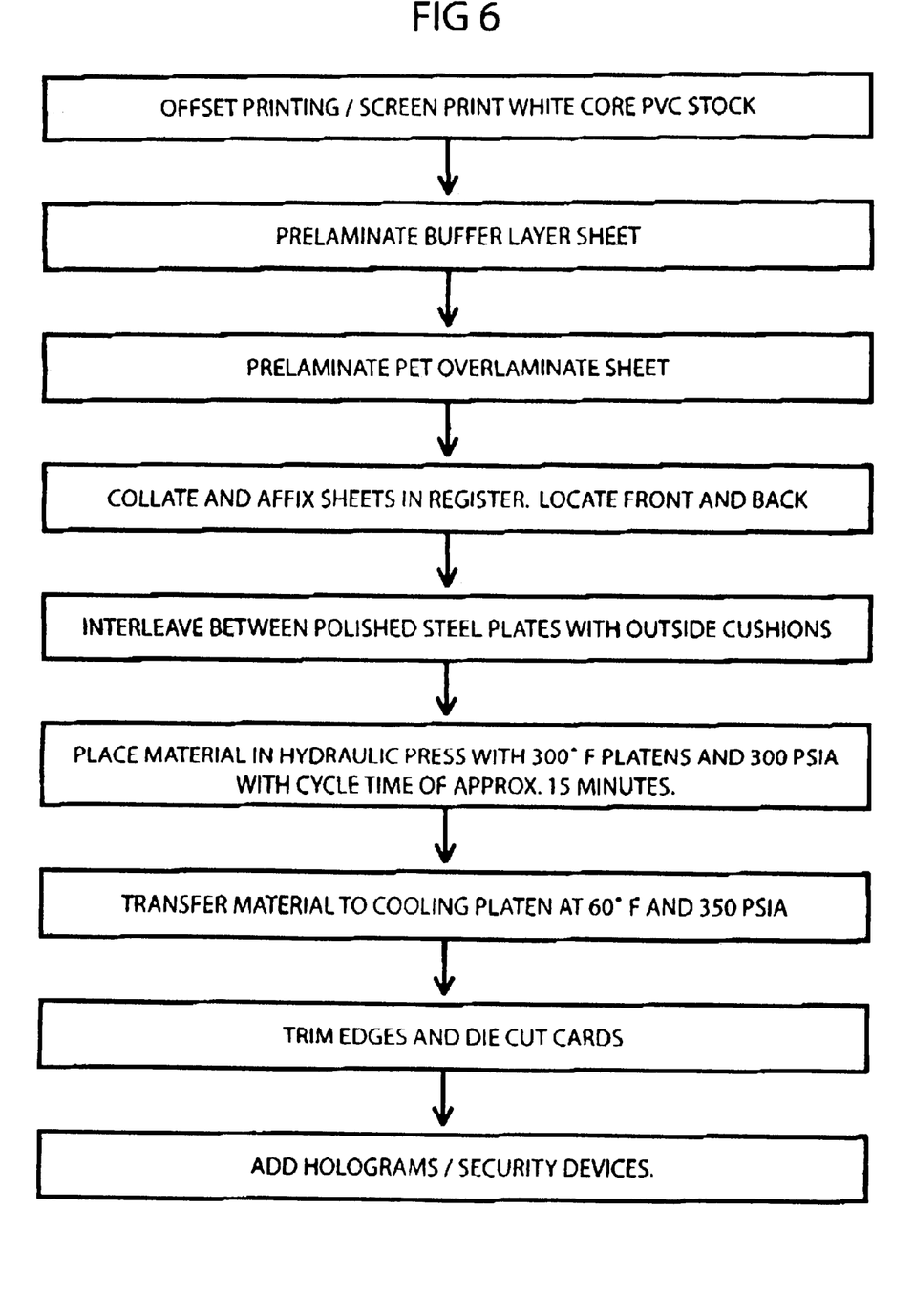
FIG. 6 is a flow chart for forming a card in accordance with the invention

The following steps illustrated in FIG. 6 may be used to manufacture a card in accordance with the invention:

1—offset print and/or screen print information onto a sheet of white core stock PVC layer 10; [or on layers 10*a*, 10*b* as shown in the figures].

2—The sheet containing the white stock PVC layer 10 is then covered on top and bottom with a sheet of buffer material.

3—Then a sheet of PET material is placed on top and bottom of the sheets of buffer material.

4—The sheets are collated and registered so that the "front" and "back" of the cards are properly located. These sheets (and possibly others) may then be bonded together in one step as further noted below.

5—In one embodiment a white printed (or blank) PVC sheet is collated with sheets of buffer material and pre-collated sheets of PET material overlaid with sheets of buffer material which are in turn overlaid with sheets of PVC material. The sheets may include a magnetic stripe where required 6—The sheets are collated and affixed in register to ensure the proper location front and back of the sheet material.

7—The sheets are interleaved between polished steel plates with outside cushions.

8—The sheets are placed in an hydraulic press with platens held at 300° F. and programmed to impart a pressure of 300 pounds per square inch absolute (psia) for a cycle time of approximately 15 minutes.

9—The sheets which are by then bonded together are then transferred to cooling platens held at 60° F. and programmed to impart a pressure of 350 psia.

10—The sheets are then cut up into standard cards; the edges of the cards are trimmed as dictated by a die cut.

11—holographic material and other indicia may then be added to each card.

12—The cards may then shipped to a customer (or his agent) for personalization and subsequent issuance to the customer's customers.

What is claimed is:

1. A multi layered card comprising:
    a layer of polyester terepthalate (PET) material having a first coefficient of expansion as a function of temperature;
    a layer of polyvinyl chloride (PVC) material having a second coefficient of expansion as a function of temperature; where said first and second coefficients of expansion have substantially different values; and
    a buffer layer of plastic material attached on one surface to the PET layer and attached on its other surface to the PVC layer, said buffer layer having a coefficient of expansion as a function of temperature whose value is intermediate that of said first and second coefficients of expansion; whereby the stress between the PET layer and the buffer layer and between the buffer layer and the PVC layer due to temperature are less than the stress that would exist if the PET and PVC layers were in direct contact with each other.

2. The multi-layered card as claimed in claim 1, wherein the buffer layer is resistant to humidity.

3. The multi-layered card as claimed in claim 1 wherein the buffer layer is made of one of the following materials: a copolymer of PVC and polyethelene (PE), a copolymer of PVC and polyvinyl acetate with 10% to 30% acetate content, polyolefins, ethylene, vinyl acetate, acrylics and amorphous polyesters.

4. The multi-layered card as claimed in claim 3 wherein the multi layered card is approximately 0.03 inches thick.

5. The multi-layered card as claimed in claim 1 wherein the buffer layer is formed of a material whose response to stress and strain is intermediate to the response of PET and PVC.

6. The multi-layered card as claimed in claim 1 wherein the buffer layer is formed of a material which is bondable to the PET layer and the PVC layer and which is humidity resistant.

7. The multi layered card as claimed in claim 1 wherein the material forming the buffer layer has a very low degree of moisture absorbance and wherein the buffer layer prevents direct contact between the surface of the PVC layer and the atmosphere and protects it from absorbing moisture present in the surrounding atmosphere.

8. The multi layered card as claimed in claim 1 wherein the material forming the buffer layer material may be stretched beyond its elastic limits in at least one of two directions and is heat annealed to prevent stress cracking.

9. The multi layered card as claimed in claim 1 wherein the material forming the buffer layer material is substantially more elastic than the PVC material and oriented polyester.

10. A multi layered card comprising:
    a first core layer made of one of the following materials polyvinyl chloride (PVC), amorphous polyester terepthalate (APET), PETG, compounds of PVC, and polyvinyl chloride acetate (PVCA); a first buffer layer attached to the top surface of the first core layer;
    a second buffer layer attached to the bottom surface of the first core layer;
    wherein the buffer layers are made of one of the following materials a copolymer of PVC and polyethelne (PE), a copolymer of PVC and polyvinyl acetate, polyolefins, ethylene, vinyl acetate, amorphous polyesters and acrylics; and
    a first strengthening layer attached to the top surface of the first buffer layer and a second strengthening layer attached to the bottom surface of the second buffer layer; wherein the strengthening layers are formed of one of oriented PET and polycarbonate.

11. The multi layered card as claimed in claim 10, wherein the first core layer is made of PVC material, and wherein the layer of PVC material is thicker than the buffer layers and the strengthening layers.

12. The multi layered card as claimed in claim 11, wherein the first core layer of PVC material has a first temperature coefficient (TC) of expansion, wherein the material forming the strengthening layers has a second temperature coefficient which is substantially different from said first TC; and wherein the material forming the buffer layer has a TC which is intermediate the first and second TC.

13. The multi layered card as claimed in claim 11 further including security elements contained within said card and wherein a security element is placed between a buffer layer and one of a PVC layer, a PET layer and another buffer layer.

14. The multi layered card as claimed in claim 11 further including an optical film contained within said card and wherein said optical film is placed between a buffer layer and one of a PVC layer, a PET layer and another buffer layer.

15. A multi-layered card comprising:
    a first plurality of layers of plastic materials attached to each other to form a first stack which is bowed in one direction; and
    at least one additional layer which when attached to said first plurality of layers by a process which includes the imparting of heat to the first plurality of layers and the additional layer causes the combination to be flat.

16. A multi-layered card as claimed in claim 15 wherein the first plurality of layers includes at least one layer of PVC material and one layer of PET material and one layer of buffer material between the PVC and PET layers and wherein an additional PVC layer is provided, which PVC layer shrinks more than the PET layer during lamination to cause the first plurality of layers to have a concave shape.

17. A multi-layered card as claimed in claim 15 wherein the first stack includes a layer of PVC material overlying a buffer layer which overlies a PET layer which in turn overlies a buffer layer which in turn overlies a PVC layer; wherein the PVC layer shrinks more than the Pet layer to cause the first stack to have a concave shape; and wherein the at least one additional layer includes a layer of PET material and a buffer layer.

* * * * *